July 5, 1955  R. M. BERGLUND  2,712,153
APPARATUS FOR SECTIONING AND BONING FISH
Filed Sept. 12, 1951  7 Sheets-Sheet 1

Fig 1.

INVENTOR
RALPH M. BERGLUND

BY Cushman, Darby & Cushman
ATTORNEY

July 5, 1955  R. M. BERGLUND  2,712,153
APPARATUS FOR SECTIONING AND BONING FISH
Filed Sept. 12, 1951  7 Sheets-Sheet 2

Fig 2.

INVENTOR
RALPH M. BERGLUND

BY Cushman, Darby & Cushman
ATTORNEY

July 5, 1955  R. M. BERGLUND  2,712,153
APPARATUS FOR SECTIONING AND BONING FISH
Filed Sept. 12, 1951  7 Sheets-Sheet 4

INVENTOR
RALPH M. BERGLUND
BY Cushman, Darby & Cushman
ATTORNEY

United States Patent Office 2,712,153
Patented July 5, 1955

2,712,153

APPARATUS FOR SECTIONING AND BONING FISH

Ralph M. Berglund, Bellingham, Wash., assignor to Pacific Laboratories, Inc., Bellingham, Wash., a corporation of Washington Application September 12, 1951, Serial No. 246,287

18 Claims. (Cl. 17—4)

This invention relates to apparatus and methods for sectioning and boning fish, particularly relatively large fish such as tuna. Heretofore tuna has been prepared for canning by butchering, that is removing heads, tails, fins and viscera, and then subjecting the butchered fish to a long pre-cook in retorts. The pre-cooking is commonly of from two to twelve hours in duration, at a temperature of from 212° to 220° F., and the fish are subsequently cooled for an additional twenty-four hours. After the cooling period, the fish are quartered by hand, and the bones, backbone, dark meat and skin removed by scraping, to obtain quadrants or loins of dressed meat. The pre-cooking, cooling and manual cutting and scraping require very considerable quantities of space, equipment and labor, and on this account are both costly and inefficient.

It is a principal object of the present invention to provide apparatus adapted to section raw fish speedily, accurately and mechanically, and remove the backbone, bones and dark meat therefrom, whereby a great saving in labor and pre-cooking is obtained, and dressed loins adapted and ready for mechanical skinning are produced.

Another object of the invention is to provide apparatus particularly adapted to quarter tuna and remove the backbone, bones and dark meat therefrom, with minimum damage to and loss of good meat.

A further object of the invention is to provide apparatus adapted to feed raw, whole fish in a linear path, cut twin radial incisions substantially to the backbone of the fish defining sections containing bones or other undesirable material, and substantially simultaneously coring out the backbone and thereby freeing the undesired sections so defined, meanwhile automatically maintaining the fish with its backbone in accurate coincidence with the feed path.

Another object is to provide novel and improved backbone extracting mechanism for use in fish sectioning and boning apparatus.

Still another object is to provide a novel method of simultaneously sectioning and boning raw fish to yield dressed loins free of backbone, bones and dark meat.

Further objects will be in part obvious and in part pointed out hereinafter.

The invention and the novel features thereof may best be made clear from the following description and the accompanying drawings, in which.

Figure 1:
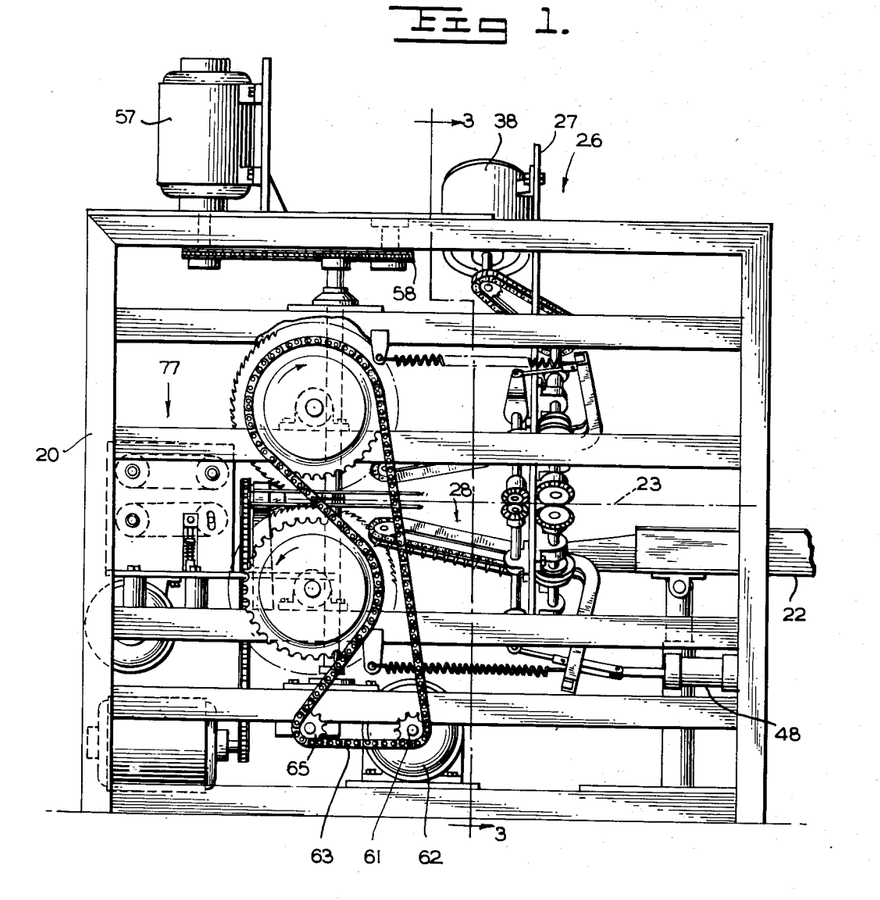
Figure 1 is a side elevational view of an exemplary embodiment of the invention, particularly adapted for the quartering of tuna.

Referring to the drawings in detail, the exemplary embodiment comprises a frame 20, at the entry end of which is mounted a guide trough 22, the guide trough being positioned below but in alignment with the linear feed path 23 through the machine, indicated in Figure 1. To accommodate different sizes of fish, guide trough 22 is preferably made adjustable relative to path 23, as by means of set screws 24 operative on the trough support member 25.

Figure 4:
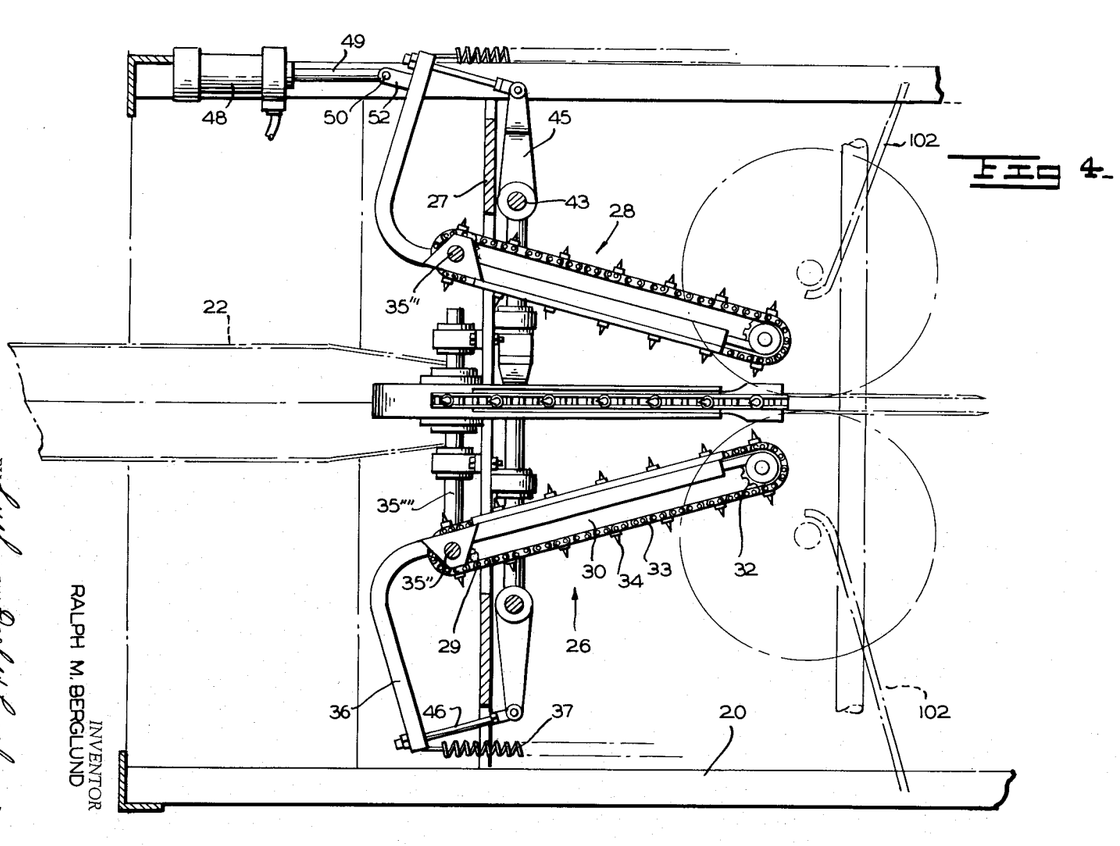
Figure 4 is a sectional view taken on the line 4—4 of Figure 2, showing details of the feed mechanism.

Adjacent the inner end of the guide trough is the feed mechanism indicated generally as 26, conveniently mounted on a transverse plate 27 fixed in the frame. The feed mechanism comprises a plurality of individual feed members 28 arranged radially about path 23, and angularly spaced relative to each other in the example by angles of 90°. As best shown in Figure 4, each feed member 28 comprises a drive sprocket 29 rotatably mounted in one end of the feed member casing 30, and an idler sprocket 32 similarly mounted at the other end. The feed member sprockets are encircled by endless feed chains 33, which are provided with spikes or teeth 34 projecting outwardly therefrom.

At their infeed ends, feed members 28 are pivotally mounted relative to the feed path on drive shafts 35, suitably supported in bearings mounted on plate 27, the drive shafts being disposed at right angles to the path, whereby the free or outfeed ends of the feed members may move radially relative thereto. Each drive sprocket 29 is fixedly engaged to the associated drive shaft 35, and from the casing 30 of each feed member adjacent the drive sprocket extends an outwardly angulated arm 36. One or more, and preferably all, of the arms 36 are engaged by resilient means such as springs 37, which extend therefrom to suitable connection points on the frame, whereby the springs tend constantly to pivot the feed members in such direction that the outfeed ends thereof are moved inwardly toward the feed path.

Figure 2:
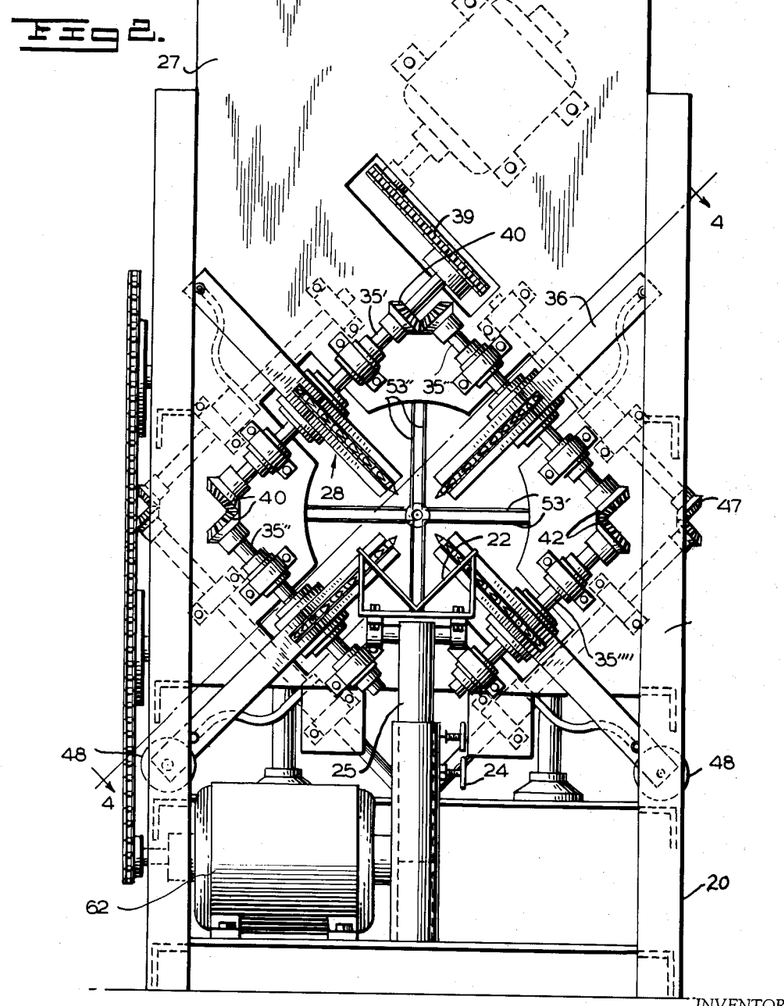
Figure 2 is an end elevational view of the apparatus of Figure 1, looking toward the infeed end thereof.
Figure 3:
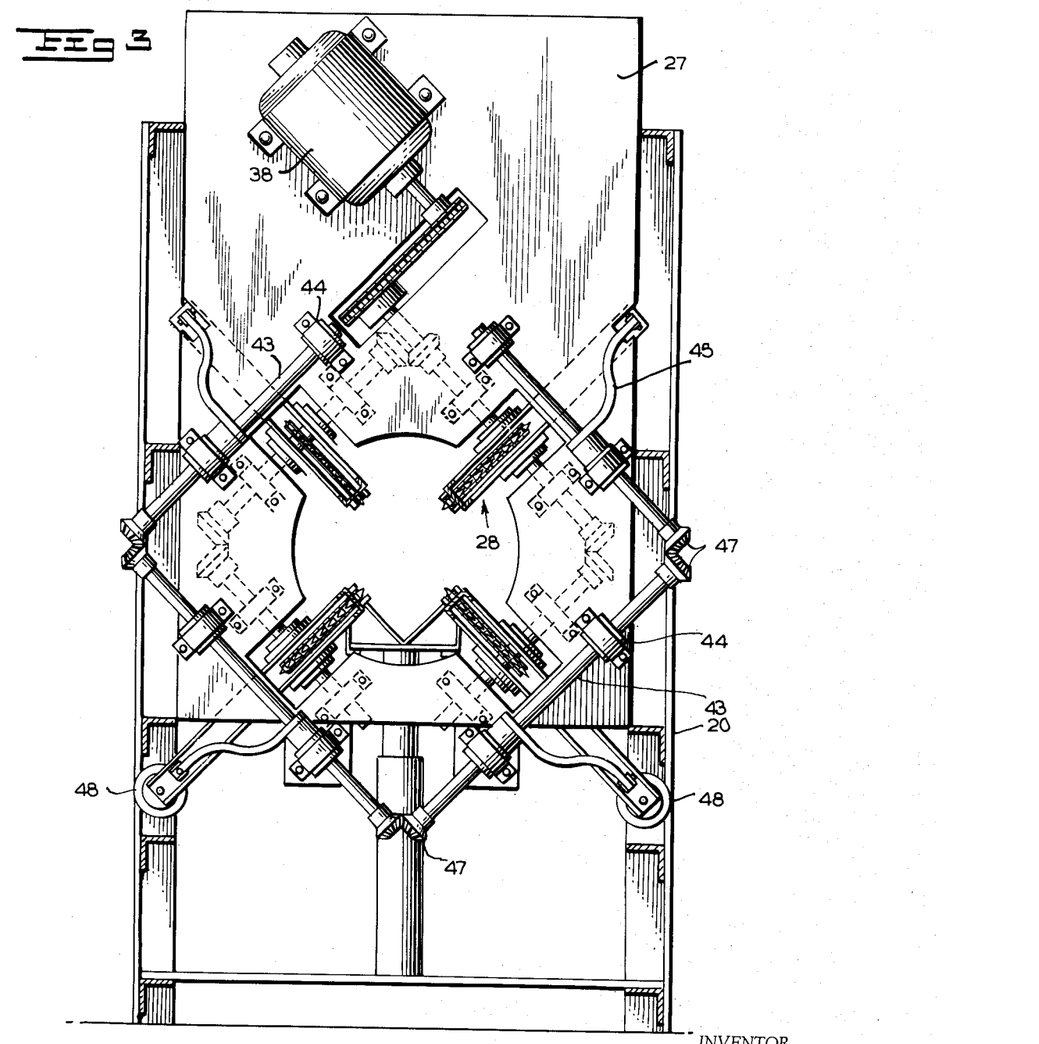
Figure 3 is a sectional view taken along the line 3—3 of Figure 1, showing some details of the self-equalizing feed member alignment mechanism.

The feed members are power driven in unison as by the electric motor 38 engaged by chain 39 in driving relationship to the drive shaft 35'. Shaft 35' drives shafts 35'' and 35''' through miter gears 40, and the shaft 35''' drives shaft 35'''' through the similar miter gears 42. As will be apparent in Figure 2, the geared interrelationship of the drive shafts is such as to rotate the drive sprockets 29 in identical direction relative to the feed path and drive the inner flight of each chain 33 in the same direction with identical speed.

A feature of primary importance in the invention is a mechanical interlock between the feed members whereby they pivot in unison, this mechanism being effective to maintain the backbone of the fish in coincidence with the linear feed path throughout its travel, unaffected by variation in size of successive sections of the fish engaged by the feed mechanism. For this purpose, tie shafts 43 are suitably mounted in bearings 44 on the side of plate 27 opposite to drive shafts 35. An arm 45 is fixedly secured to each tie shaft and extends outwardly therefrom, the outer end of each arm being secured to the outer end of the adjacent feed member arm 36 by a rigid link 46. The tie shafts 43 are linked together by miter gears 47 whereby they are constrained to turn in unison, and whereby the feed members 28 are tied together and may pivot only in unison.

Normally, springs 37 urge the outfeed ends of the feed members inwardly toward the feed path to the limit of their pivotal travel, as illustrated in Figure 4. Means are provided to move the outfeed ends of the feed members outwardly against the force of the springs for initial positioning of a fish therewithin, preferably power means such as single acting pneumatic cylinders 48, two of which are employed in the present example. The rods 49 of cylinders 48 are engaged by pins 50 to lugs 52 joined to the angulated arms 36 of the feed members.

Adjacent the outfeed ends of the feed members are mounted a plurality of rotary cutting members 53. In the drawings, four spaced pairs of cutting members are provided, arranged radially of the feed path and angularly spaced relative to each other by angles of 90°. The cutting members preferably are angularly offset relative to the feed members, conveniently 45° as shown, and disposed in horizontal and vertical planes. By reason of the angular offset relative to the feed members, the cutting members and feed members may be mounted in slightly overlapping relationship, that is with outfeed ends of the feed members entering between cutting member pairs, whereby maximum accuracy of feed is attained.

The horizontal cutting members 53' are mounted on vertical shafts 54, driven together through chain 55 and drive sprocket 56 by an electric motor 57 mounted vertically atop the frame. Chain 55 is engaged also by an idler sprocket 58, and engages the shaft sprockets 59 in such manner that the shafts 54 contra-rotate, whereby all the cutting members 53' are driven with edges adjacent the feed path moving in the direction of the fish feed.

The vertical cutting members 53" are mounted on horizontal shafts 60, displaced slightly rearwardly to clear vertical shafts 54 (see Figure 5), and are driven together in contra-rotating manner by drive sprocket 61 of motor 62 through chain 63, the chain engaging end sprockets 64 fixed on the shafts 60. As will be apparent in Figure 1, chain 63 is effective with the aid of idler sprocket 65 to drive all the vertical cutting members 53" so that they also rotate with edges adjacent the feed path moving in the direction of the fish feed.

Suitably supported in bearing 66 immediately adjacent the outfeed sides of the cutting members, within their outer confines and in axial alignment with the feed path, is a rotary coring tool 67. Bearing 66 is supported by spaced legs 68 mounted on an extension of the frame, said legs enclosing but clearing the rearward portion of the lower vertical cutting members 53" therebetween. A sprocket 69 is fixed on the trailing end of the coring tool, whereby the tool is rotated by chain 70 and the drive sprocket 72 of motor 73. The leading edge 74 of the coring tool is bevelled outwardly as shown, and the leading edge of bearing 66 may be similarly bevelled in alignment therewith. The interior passage 76 of the coring tool desirably increases in diameter somewhat from leading to trailing end.

Figure 5:
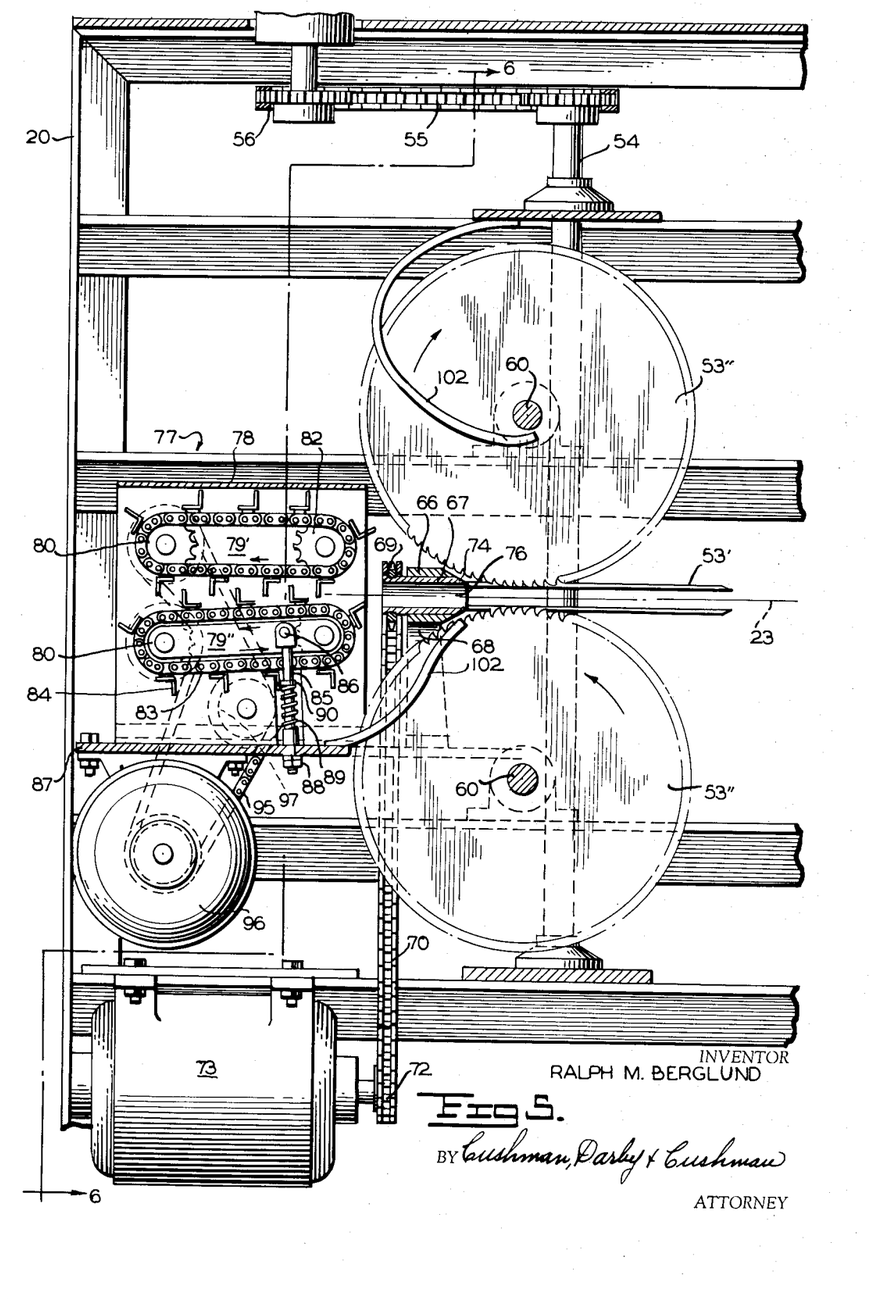
Figure 5 is a vertical sectional view taken on the linear feed path of the apparatus, showing the relationship of the cutting members, coring tool and extracting mechanism.
Figure 6:
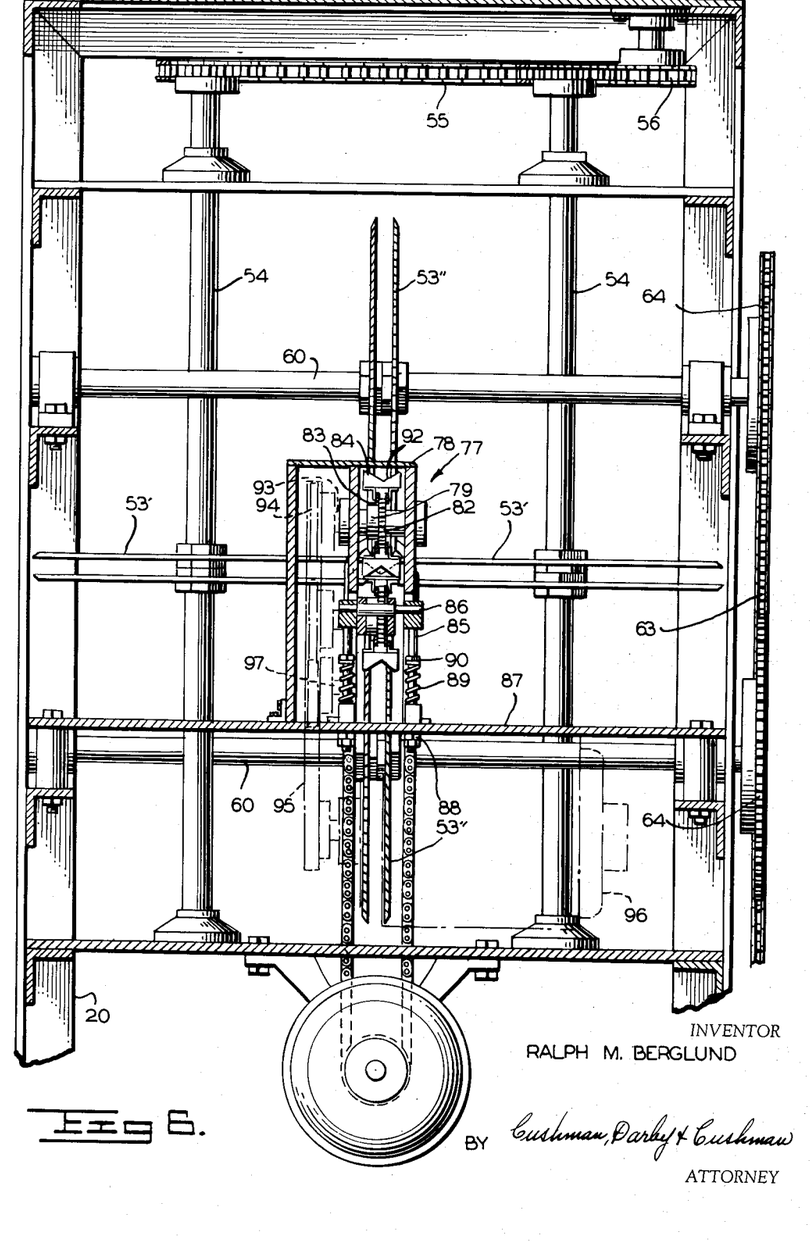
Figure 6 is a sectional view taken along the line 6—6 of Figure 5, showing details of the cutting member drive and the backbone extracting mechanism.

Immediately adjacent the outfeed or trailing end of the coring tool is an extractor mechanism indicated generally as 77. The extractor mechanism is partially enclosed by a casing 78, and comprises essentially two elongated feed elements 79 disposed on opposite sides of the feed path in general alignment therewith. Each feed element 79 supports a drive sprocket 80 and an idler sprocket 82 at opposite ends thereof, the sprockets of each element being enclosed by endless chains 83, from which teeth 84 project outwardly at intervals. As will be evident in Figure 5 of the drawings, the teeth 84 of chains 83 are arranged in non-meshing relationship. The upper feed element 79' is mounted in fixed parallelism relative to the feed path. The lower feed element 79", however, is pivotally mounted on the axis of its drive sprocket 80, whereby its leading or infeed end is free to move radially with respect to the feed path. A rod 85 is pivotally engaged at 86 to each side of the lower feed element 79", adjacent the free end thereof, the rods 85 extending through frame plate 87 and carrying at their outer ends stop nuts 88, whereby the approach of feed element 79" to the fixed feed element 79' is limited. The rods 85 are encircled by springs 89 extending between plate 87 and rod collars 90, said springs constantly urging the free end of element 79 inwardly to the limit of its travel. The inner edge 92 of teeth 84 are of V-configuration, as shown in Figure 6, whereby they are adapted to retain a backbone engaged therebetween against lateral displacement. Drive sprockets 80 of feed elements 79 are mounted on stub shafts 93, to which are fixed also sprockets 94, which are driven through chain 95 by motor 96. Chain 95 encircles idler sprocket 97 and sprockets 94 in such manner that chains 83 are driven in the same direction relative to the feed path, as indicated in Figure 5.

Operation of the device will now be described in detail. In order to position a fish for sectioning, pneumatic cylinders 48 are actuated to retract rods 49, thereby causing feed members 28 to pivot and their outfeed ends to move outwardly from the feed path to the limit of their travel. With the various mechanisms of the machine at rest, a raw, butchered tuna may be placed on guide trough 22 and moved into the machine until engaged by cutting member 53. Preferably, the fish is positioned tail end first, and with back down, so that bone-containing and dark meat sections will be aligned with the horizontal and vertical cutting members. In the preferred mode of operation, the fish is moved into the machine until its tail is engaged by the horizontal cutting members 53', the adipose horizontal rudder structure of the fish being positively positioned between the horizontal cutting member pairs.

With the fish so positioned, the cutting member, coring tool and extractor mechanism drives may be simultaneously activated. Pneumatic cylinders 48 are then deactivated whereby springs 37 function to pivot the feed members inwardly until the teeth 34 of their chains 33 engage and sink into the flesh of the fish. Thereupon the feed member drive may be actuated and the fish will be fed into the cutting members in a steady and controlled manner.

In feeding the fish, the linked feed members function automatically to maintain the fish properly centered, that is, with its backbone in accurate coincidence with the feed path. Differences in dimensions of successive sections of the fish will cause the feed members to pivot with respect to the path, and while the pressures exerted against individual feed members may tend to vary, they are constrained to pivot in unison, and accordingly will maintain the fish with backbone properly aligned throughout its feed. The feed mechanism, then, not only provides the major propelling force to drive the fish through the cutting members and coring tool, but also automatically and accurately maintains the fish in proper central alignment.

Figures 7, 8, 9, 10:
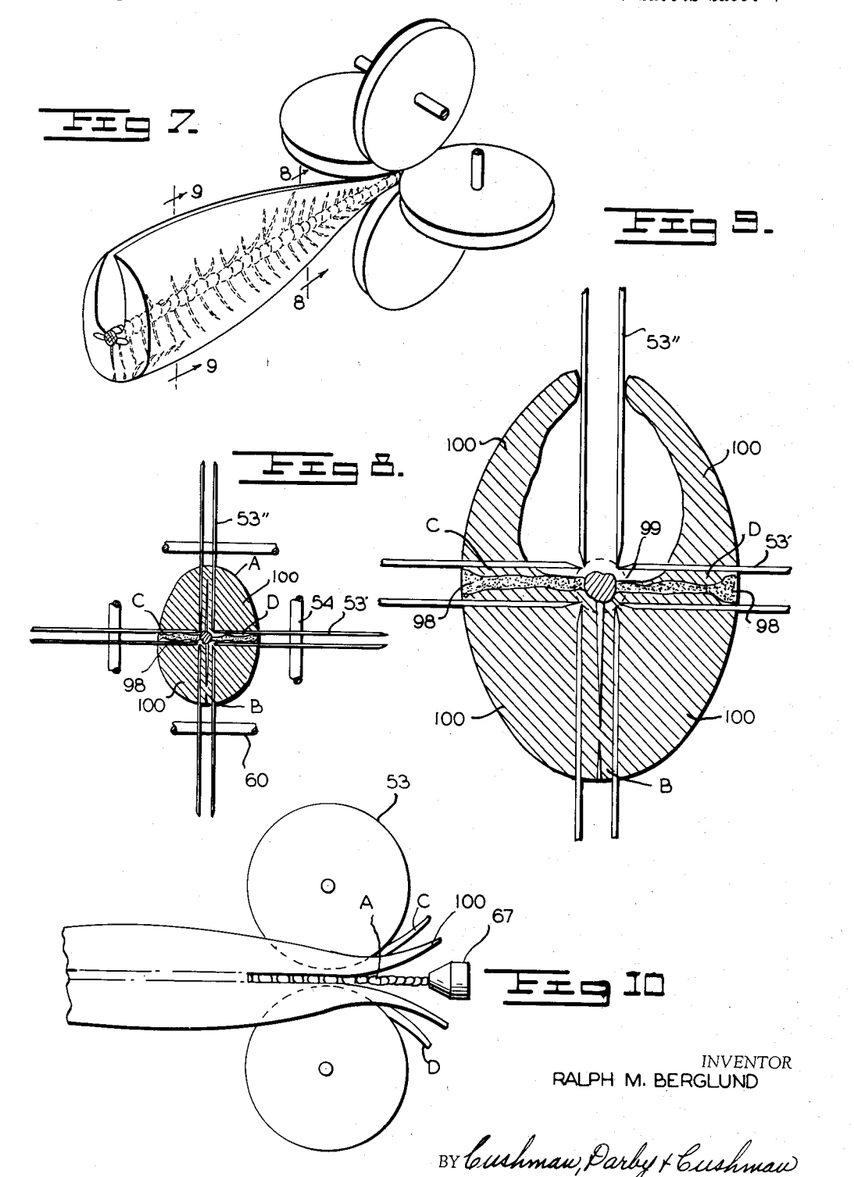
Figure 7 is a diagrammatic sketch showing the preferred manner of presentation of a fish to the cutting members.
Figure 8 is a diagrammatic sketch illustrating the engagement of the fish by the cutting members when the fish has advanced thereinto to the line 8—8 of Figure 7.
Figure 9 is a diagrammatic sketch illustrating the engagement of the fish by the cutting members when the fish has advanced thereinto to the line 9—9 of Figure 7.
Figure 10 is a diagrammatic illustration of the backbone coring operation, with the coring member moved outwardly from its true relative position for the sake of clarity.

The cutting members, as previously described, rotate in such direction as to assist somewhat the fish feed, and as appears in Figures 8 and 9 cut pairs of radial incisions into the fish substantially to the backbone thereof. Employing four pairs of cutting members and operating upon the fish in back down position, the upper pair of vertical cutting members 53" define a section indicated as A in Figure 8 from the tail to the belly cavity, which section includes the ventral bones of the tuna, and the lower pair of vertical cutting members define a section B which includes the dorsal bones of the fish. The horizontal cutting members 53' simultaneously define sections indicated as C and D, which include the dark meat portions 98 of the fish and the lateral bones. Obviously, the spacing between cutting member pairs is selected to define a section of suitable width to include the undesired material with a minimum of wastage of good meat.

In sectioning tuna, it has been found desirable to employ saws as the vertical cutting members, that is, as the cutting members defining the dorsal and ventral sections of undesired material. The saws preferably are arranged to run backwardly, with teeth facing away from the direction of travel, this mode of operation having been found to perform the required cutting operation most successfully, without applying excessive feed impulse to the fish. The horizontal cutting members, employed for defining the lateral dark meat sections of the fish, may be conventional knives.

As the fish passes through the cutting members, it is fed into the rotary coring tool 67, which functions to core out a central backbone including portion of the fish indicated by the dotted line 99 in Figure 9. Coring out of the backbone subsequent to the cutting operation, as will be readily understood, is effective to free the four undesired sections defined by the cutting elements from the body of the fish, as well as the four dressed meat quadrants 100. The coring tool, as will be evident in Figure 5, is positioned as closely as possible to the outfeed side of the cutting members and in the exemplary embodiment completely within their outer contour. In this manner, the cutting members are enabled to assist materially in guiding the backbone of the fish into and through the coring tool. As previously stated, the leading edge 74 of the coring tool is outwardly bevelled whereby the tool functions not only to detach the sections A, B, C and D and the dressed meat quadrants 100 from the backbone portion, but also to initially direct these sections outwardly from the backbone, as diagrammatically illustrated in Figure 10.

Immediately adjacent the outfeed end of the coring tool is provided the extractor mechanism 77, disposed in axial alignment therewith. The backbone portion first emerging from the coring tool will extend between converging teeth 84 at the infeed ends of the extractor chains 83, and will be engaged therebetween as the opposed but non-meshing teeth converge and move rearwardly. The diameter of the backbone will require the lower extractor element 79 to pivot downwardly about its outfeed end, compressing springs 89 whereby these springs will function to resiliently retain the backbone between the extractor feed elements.

The V-configuration of the outer edges of the extractor teeth insures maintenance of the backbone in axial alignment with the feed path through the extractor. The speed of the feed of the extractor mechanism is desirably adjusted to coincide with the feed of the feed mechanism 26 or to exceed it slightly, whereby the backbone will be removed steadily and in one piece. The extractor mechanism, being closely positioned relative to the coring tool, functions in cooperation with feed mechanism 26 and cutting members 53 to maintain alignment of the backbone and guide it accurately through the coring tool.

The extractor mechanism casing 78 may be provided with suitable deflector or guide plates (not shown) adapted to divert and guide sections A, B, C and D and the dressed meat quadrants 100 onto suitable tables or conveyors adapted to receive them, as may be convenient. Additionally, guide fingers 102 may be mounted on the frame to extend into and between pairs of cutting members to assist in the diversion and direction of the fish sections A, B, C, and D. The extractor mechanism functions also, it will be evident, to assist in feeding the trailing end of the fish after it has passed beyond the feed mechanism, and to feed the trailing extreme end of the fish through the coring tool after it has passed the cutting members. When the fish has been completely sectioned, the various mechanisms of the device may be stopped, pneumatic cylinders 48 again actuated to open the feed mechanism, and a succeeding fish positioned for sectioning.

The method of the invention will be substantially apparent from the foregoing description of the apparatus. Briefly, it comprises the steps of feeding a whole but butchered raw fish, preferably tail end first, in a linear path past a cutting station, whereat a plurality of pairs of radial incisions are made in the fish substantially to the backbone thereof to define sections containing undesired material of the fish. Immediately after the cutting step, and substantially simultaneously therewith, the backbone of the fish is cored out to separate the undesired sections defined by the incisions, and to free the plurality of loins of dressed meat therebetween. As an outstanding feature of the method, the backbone of the fish is accurately maintained in coincidence with a linear path during the cutting and coring operations whereby the fish is efficiently sectioned and boned with minimum loss of good meat. The method produces quadrants or loins of dressed meat ready and adapted for mechanical skinning or other further processing.

It will thus be seen that there has been provided by this invention a structure and method in which the various objects hereinbefore set forth, together with many practical advantages, are successfully achieved. As various possible embodiments may be made of the individual features of the invention, all without departing from the scope thereof, it is to be understood that all matter hereinbefore set forth or shown in the accompanying drawings is to be interpreted as illustrative, and not in a limited sense.

I claim:

1. Apparatus for sectioning and boning fish comprising a frame, a plurality of cutting members mounted in said frame radially of a linear path, a plurality of elongated feed members mounted in said frame and arranged radially of said path with outfeed ends adjacent said cutting members, said feed members being pivotally mounted relative to said path adjacent their infeed ends, means linking said feed members whereby they pivot in unison, and means resiliently urging the outfeed ends of said feed members inwardly.

2. Apparatus for sectioning and boning fish comprising a frame, a plurality of cutting members mounted in said frame radially of a linear path, a plurality of elongated feed members mounted in said frame and arranged radially of said path with outfeed ends adjacent said cutting members, said feed members being pivotally mounted relative to said path adjacent their infeed ends, means linking said feed members whereby they pivot in unison, means resiliently urging the outfeed ends of said feed members inwardly, and controllable means for moving the outfeed ends of said feed members outwardly.

3. Apparatus for sectioning and boning fish comprising a frame, a plurality of cutting members mounted in said frame radially of a linear path, a plurality of elongated feed members mounted in said frame and arranged radially of said path with outfeed ends adjacent said cutting members, said feed members being pivotally mounted relative to said path adjacent their infeed ends, means linking said feed members whereby they pivot in unison, means resiliently urging the outfeed ends of said feed members inwardly, controllable means for moving the outfeed ends of said feed members outwardly, and a rotary coring tool mounted in said frame in alignment with said path adjacent the outfeed side of said cutting members.

4. Apparatus for sectioning and boning fish comprising a frame, a plurality of cutting members mounted in said frame radially of a linear path, a plurality of elongated feed members mounted in said frame and arranged radially of said path with outfeed ends adjacent said cutting members, a guide trough disposed parallel to said path adjacent the infeed ends of said feed members, said feed members being pivotally mounted relative to said path adjacent their infeed ends, means linking said feed members whereby they pivot in unison, means resiliently urging the outfeed ends of said feed members inwardly, controllable means for moving the outfeed ends of said feed members outwardly, a rotary coring tool mounted in said frame in alignment with said path adjacent the outfeed side of said cutting members, and backbone extracting mechanism mounted in said frame in alignment with the outfeed side of said coring tool.

5. Apparatus for quartering and boning fish comprising a frame, four laterally spaced pairs of rotary cutting members mounted in said frame radially of a given path, four elongated feed members mounted in said frame and arranged radially of said path with outfeed ends adjacent said cutting members, said feed members being pivotally mounted relative to said path adjacent their infeed ends, means linking said feed members whereby they pivot in unison, and means resiliently urging the outfeed ends of said feed members inwardly.

6. Apparatus for quartering and boning fish comprising a frame, four laterally spaced pairs of rotary cutting members mounted in said frame radially of a given path, four elongated feed members mounted in said frame and arranged radially of said path with outfeed ends adjacent said cutting members, a guide trough disposed parallel to said path adjacent the infeed ends of said feed members, said feed members being pivotally mounted relative to said path adjacent their infeed ends, means linking said feed members whereby they pivot in unison, means resiliently urging the outfeed ends of said feed members inwardly, and a rotary coring tool mounted in said frame in alignment with said path adjacent the outfeed side of said cutting members.

7. Apparatus for quartering and boning fish comprising a frame, four laterally spaced pairs of rotary cutting members mounted in said frame radially of a linear path, four elongated feed members mounted in said frame and arranged radially of said path with outfeed ends adjacent said cutting members, a guide trough disposed parallel to said path adjacent the infeed ends of said feed members, said feed members being pivotally mounted relative to said path adjacent their infeed ends, means linking said feed members whereby they pivot in unison, means resiliently urging the outfeed ends of said feed members inwardly, controllable means for moving the outfeed ends of said feed members outwardly, a rotary coring tool mounted in said frame in alignment with said path adjacent the outfeed side of said cutting members, and backbone extracting mechanism mounted in said frame in alignment with the outfeed side of said coring tool.

8. Apparatus for quartering and boning fish comprising a frame, four laterally spaced pairs of rotary cutting members mounted in said frame radially of a linear path and at right angles to each other, four elongated feed members including externally mounted toothed chains mounted in said frame and arranged radially of said path adjacent said cutting members at right angles to each other and offset relative to said cutting members, said feed members being pivotally mounted adjacent their infeed ends whereby the outfeed ends thereof may move radially relative to said path, means for driving said feed members whereby the inner flights of said chains move in unison toward said cutting members, means for driving said cutting members, means linking said feed members together whereby they pivot in unison, and means resiliently urging the outfeed ends of said feed members inwardly.

9. Apparatus for quartering and boning fish comprising a frame, four laterally spaced pairs of rotary cutting members mounted in said frame radially of a linear path and at right angles to each other, four elongated feed members including externally mounted toothed chains mounted in said frame and arranged radially of said path adjacent said cutting members at right angles to each other and offset relative to said cutting members, said feed members being pivotally mounted adjacent their infeed ends whereby the outfeed ends thereof may move radially relative to said path, means for driving said feed members whereby the inner flights of their chains move in unison toward said cutting members, means for driving said cutting members whereby their inner edges move in the direction of the feed member feed, means linking said feed members together whereby they pivot in unison, means resiliently urging the outfeed ends of said feed members inwardly, controllable power means adapted to move the outfeed ends of said feed members outwardly, and a rotary coring tool mounted in said frame in alignment with said path adjacent the outfeed sides of said cutting members.

10. Apparatus according to claim 9, wherein two of said pairs of cutting members are saws disposed in parallel planes and adapted to cut thin sections in a fish including dorsal and ventral bones, and the other two pairs of cutting members are knives disposed in parallel planes and adapted to cut thin sections in a fish including dark meat and lateral bones.

11. Apparatus for quartering and boning fish comprising a frame, four laterally spaced pairs of rotary cutting members mounted in said frame radially of a horizontal linear path and at right angles to each other, means for driving said cutting members, four elongated feed members mounted in said frame and arranged radially of said path adjacent the infeed side of said cutting members at right angles to each other and offset relative to said cutting members, said feed members being pivotally mounted adjacent their infeed ends on drive shafts whereby the outfeed ends thereof may move radially relative to said path, means for driving said drive shafts in unison, means linking said feed members together whereby they pivot in unison, and means resiliently urging the outfeed ends of said feed members inwardly.

12. Apparatus for quartering and boning fish comprising a frame, four laterally spaced pairs of rotary cutting members mounted in said frame radially of a horizontal linear path and at right angles to each other, means for driving said cutting members in identical direction relative to said path, four elongated feed members mounted in said frame and arranged radially of said path adjacent the infeed side of said cutting members at right angles to each other and offset relative to said cutting members, said feed members being pivotally mounted adjacent their infeed ends on drive shafts whereby the outfeed ends thereof may move radially relative to said path, means for driving said drive shafts in unison whereby said feed members move toward said cutting members, means linking said feed members together whereby they pivot in unison, means resiliently urging the outfeed ends of said feed members inwardly, controllable means adapted to move the outfeed ends of said feed members outwardly, and a rotary coring tool mounted in said frame in alignment with said path adjacent the outfeed side of said cutting members.

13. Apparatus according to claim 12, wherein two of said pairs of cutting members are saws disposed in vertical planes and adapted to cut thin sections in a fish including dorsal and ventral bones, and the other two pairs of cutting members are knives disposed in horizontal planes and adapted to cut thin sections in a fish including dark meat and lateral bones.

14. Apparatus for quartering and boning fish comprising a frame, four laterally spaced pairs of rotary cutting members mounted in said frame radially of a horizontal linear path and at right angles to each other, means for driving said cutting members in identical direction relative to said path, four elongated feed members mounted in said frame and arranged radially of said path adjacent the infeed side of said cutting members at right angles to each other and offset relative to said cutting members, said feed members being pivotally mounted adjacent their infeed ends on drive shafts whereby the outfeed ends thereof may move radially relative to said path, means for driving said drive shafts in unison, means linking said feed members together whereby they pivot in unison, means resiliently urging the outfeed ends of said feed members inwardly, controllable power means adapted to move the outfeed ends of said feed members outwardly, a rotary coring tool mounted in said frame in alignment with said path adjacent the outfeed side of said cutting members, and backbone extracting mechanism mounted in said frame in alignment with the outfeed side of said coring tool.

15. Apparatus for sectioning and boning fish comprising a frame, a plurality of cutting members mounted in said frame radially of a linear path, a plurality of elongated feed members mounted in said frame and arranged radially of said path with outfeed ends thereof adjacent said cutting members, said feed members being pivotally mounted relative to said path adjacent their infeed ends, means linking said feed members whereby they pivot in unison, a rotary coring tool mounted in said frame in alignment with said path adjacent the outfeed side of said cutting members, and backbone extracting mechanism mounted in said frame in alignment with the outfeed end of said coring tool, said extracting mechanism including elongated endless feed elements disposed on opposite sides of said path, means for driving said feed elements whereby the inner flights thereof travel in the feed direction, backbone engaging teeth extending outwardly from said feed elements in non-meshing relationship, one of said feed elements being pivotally mounted relative to said path adjacent its outfeed end, and means resiliently urging the infeed end of said pivotally mounted feed element inwardly toward said path.

16. Backbone extracting mechanism comprising a frame, elongated endless feed elements mounted in said frame on opposite sides of a linear path in general alignment therewith, means for driving said feed elements whereby the inner flights thereof travel in the same direction, backbone engaging teeth extending outwardly from said feed elements in non-meshing relationship, one of said feed elements being pivotally mounted relative to said path adjacent its outfeed end, and means resiliently urging the infeed end of said pivotally mounted feed element inwardly toward said path.

17. Backbone extracting mechanism comprising a frame, elongated endless feed elements mounted in said frame on opposite sides of a linear path in general alignment therewith, means for driving said feed elements whereby the inner flights thereof travel in unison in the same direction, backbone engaging teeth extending outwardly from said feed elements in non-meshing relationship, the outer edges of said teeth being formed into V shape to prevent lateral displacement of the backbone engaged thereby, one of said feed elements being fixedly mounted relative to said path, the other of said feed elements being pivotally mounted relative to said path adjacent its outfeed end, and means resiliently urging the infeed end of said pivotally mounted feed element inwardly toward said path.

18. Apparatus for sectioning and boning fish comprising a frame, plural means mounted in said frame for feeding a fish in a linear path, cutting means mounted in said frame adjacent said path adapted to make a plurality of pairs of radial incisions in the fish moving therepast substantially to the backbone, compensating means associated with said feeding means for maintaining the backbone of the fish in coincidence with said path during its travel, and backbone coring means mounted in said frame in alignment with said path adjacent the outfeed side of said cutting means.

References Cited in the file of this patent

UNITED STATES PATENTS

| 1,365,575 | Waugh | Jan. 11, 1921 |
| 2,230,942 | Gibbs | Feb. 4, 1941 |
| 2,311,176 | Hutton | Feb. 16, 1943 |
| 2,470,289 | Christiansen | May 17, 1949 |
| 2,497,554 | Meissner | Feb. 14, 1950 |
| 2,534,219 | Berglund | Dec. 19, 1950 |
| 2,552,984 | Leuschner | May 15, 1951 |
| 2,552,985 | Leuschner | May 15, 1951 |
| 2,580,992 | Biery | Jan. 1, 1952 |
| 2,612,652 | Berglund | Oct. 7, 1952 |
| 2,636,213 | Fedevich | Apr. 28, 1953 |

FOREIGN PATENTS

| 127,129 | Australia | Mar. 12, 1948 |